United States Patent
Caddell, Jr. et al.

[11] Patent Number: 6,158,955
[45] Date of Patent: Dec. 12, 2000

[54] WELDING METHOD AND ASSEMBLY THEREFOR

[75] Inventors: James W. Caddell, Jr., Milford; Robert D. Lawrence, Hammersville, both of Ohio

[73] Assignee: General Electric Company, Cincinnati, Ohio

[21] Appl. No.: 09/325,266

[22] Filed: Jun. 3, 1999

[51] Int. Cl.[7] ...................................................... F01D 5/14
[52] U.S. Cl. ..................... 415/115; 416/96 A; 416/97 R; 416/224; 29/889.01
[58] Field of Search .......................... 415/115; 416/96 A, 416/97 R, 213 R, 224, 229 A; 29/889.01, 889.07, 889.72; 228/119, 219

[56] References Cited

U.S. PATENT DOCUMENTS

| | | | |
|---|---|---|---|
| 4,726,104 | 2/1988 | Foster et al. ........................ | 29/156.8 B |
| 5,584,662 | 12/1996 | Mannava et al. .................... | 416/241 R |
| 5,846,057 | 12/1998 | Ferrigno et al. .................... | 416/241 R |

*Primary Examiner*—Edward K. Look
*Assistant Examiner*—Ninh Nguyen
*Attorney, Agent, or Firm*—Andrew C. Hess; Gerry S. Gressel

[57] ABSTRACT

An assembly and method for welding an article, such as an air-cooled superalloy airfoil of a gas turbine engine nozzle. The method entails inserting a fixture into a cooling passage of the airfoil. The fixture is configured to close a first opening to the passage through which the fixture is inserted into the passage. The fixture is also configured to introduce a gas into the passage through a longitudinal row of ports. A through-wall crack in the airfoil is weld repaired while the gas flow is maintained to the cavity at a rate that sufficiently pressurizes the passage to prevent the molten filler material from entering the passage through the crack, while allowing the filler material to fill the crack.

20 Claims, 3 Drawing Sheets

WELDING METHOD AND ASSEMBLY THEREFOR

FIELD OF THE INVENTION

This invention relates to welding apparatuses and methods. More particularly, this invention is directed to a method and fixturing for weld repairing a superalloy article, and particularly to preventing weld filler material from entering a cooling passage within an air-cooled airfoil through a crack being weld repaired in the airfoil surface.

BACKGROUND OF THE INVENTION

High temperature cobalt-base and nickel-base superalloys are used in the manufacture of components for the high temperature sections of gas turbine engines. Such components, which include nozzles, combustors, and turbine vanes and blades, are under strenuous high temperature conditions during engine operation, which can lead to various types of damage or deterioration. For example, erosion, cracks and other surface discontinuities tend to develop at the trailing edges of blades and nozzles during service due to foreign object impact and stresses that are aggravated by frequent thermal cycling. Because the material and processing costs of high-temperature superalloys is relatively high, restoration and repair of damaged or worn superalloy components are typically preferred over replacement. For this purpose, weld repair methods have been developed using tungsten inert gas (TIG) or laser welding processes, which are typically performed at an elevated temperature (e.g., in excess of about 1500° F. (about 815° C.)) to improve welding yields and ensure that the mechanical properties of the superalloy are maintained. To prevent oxidation, high-temperature weld repairs of superalloys are often performed in enclosures containing a controlled atmosphere, e.g., an inert gas such as argon.

A complication exists when welding repairing a crack in the wall of a hollow component, such as an air-cooled blade or nozzle having an interior cooling cavity or passage. During welding, the cooling passages of these components are susceptible to blockage by weld filler material that enters the passages through the cracks being repaired. An example is shown in FIG. 1, which shows a nozzle 10 that must be assembled with an insert 12 that closely fits within a cooling passage 14 of the nozzle 10. Any weld filler material that enters the cooling passage 14 has the potential for blocking the passage 14 or causing interference with the insert 12. While methods for blocking surface cooling holes 22 (typically at the trailing edge 28 of the nozzle airfoil 24) are known, a difficulty remains in providing for complete filling of a crack 30 without weld filler also entering the passage 14 through the crack 30.

BRIEF SUMMARY OF THE INVENTION

The present invention generally provides an assembly and method for welding an article, and particularly an air-cooled superalloy airfoil of a gas turbine engine. The assembly and method serve to prevent ingress of weld filler material into cooling passages and other cavities within the airfoil during repair of the airfoil by welding, yet allows molten weld filler material to fill a through-wall crack being repaired in the airfoil.

The method of this invention generally entails the use of a fixture that is installed in a cavity of an article having a crack or other through-wall defect that requires repair by welding. The fixture is configured to close a first opening to the cavity through which the fixture is inserted. The fixture is also configured to introduce a gas into the cavity at a rate sufficient to pressurize the cavity before the gas exits the cavity through a hole to which the cavity is fluidically coupled, e.g., a cooling hole of an airfoil cooling passage. For this purpose, the fixture preferably has an elongate portion with an aligned longitudinal row of ports. A gas is then flowed through the fixture into the cavity, after which it is permitted to exit the cavity through the hole. A crack in the article is then weld repaired in any suitable manner, while the gas flow is maintained to the cavity at a rate that prevents the molten filler material from entering the cavity through the crack, yet allows the filler material to fill the crack.

As described above, the apparatus and method of this invention address the difficulty of weld repairing articles with an interior cavity, as is the case when weld repairing a through-wall crack in a superalloy airfoil. With the invention, a through-wall crack can be weld repaired by completely filling the crack with weld filler material, while flow of the molten filler material into the adjoining airfoil cooling passage is avoided in order to prevent blockage of the passage by the filler material.

Other objects and advantages of this invention will be better appreciated from the following detailed description.

DETAILED DESCRIPTION OF THE INVENTION

The present invention will be discussed below in terms of weld repairing air-cooled superalloy airfoils. However, the invention is generally applicable to a variety of applications in which a through-wall crack in a hollow article must be repaired with a filler material while preventing or at least reducing the amount of filler material allowed to enter a cavity within the article.

Figure 1:
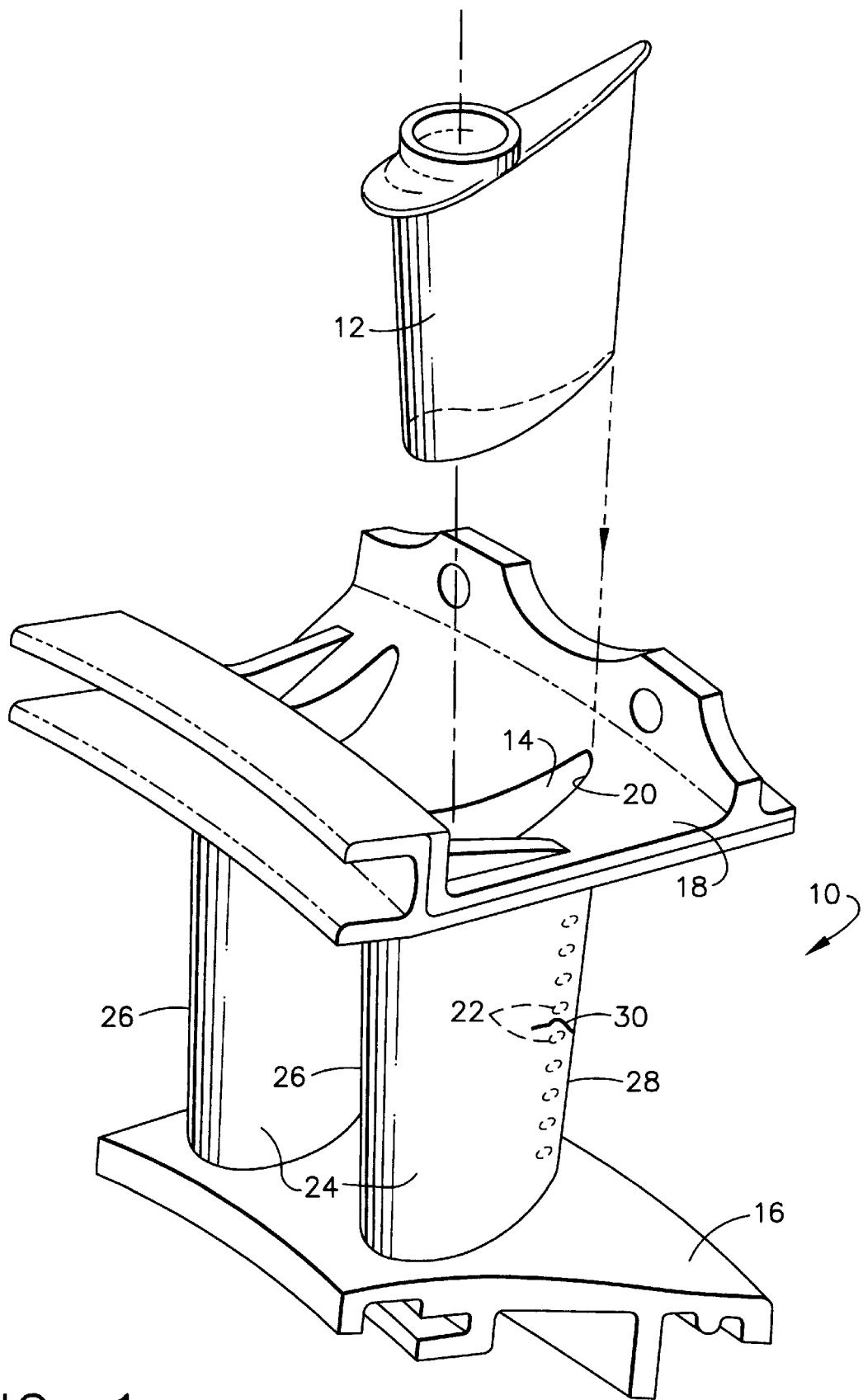
FIG. 1 is a perspective view of a gas turbine engine nozzle assembly.

With reference to FIG. 1, a gas turbine engine nozzle 10 is shown as being composed of a pair of airfoils 24 between inner and outer bands 16 and 18, respectively. Each airfoil 24 has a leading edge 26 and a trailing edge 28, the latter of which is equipped with a number of cooling holes 22. The cooling holes 22 are fluidically coupled to cooling passages 14 within their corresponding airfoils 24. The nozzle 10 is also shown as having a crack 30 at the trailing edge 28 of one of the airfoils 24. The crack 30 must be weld repaired before the nozzle 10 can be assembled with an insert 12 that closely fits within the cooling passage 14. However, any weld filler material that enters the cooling passage 14 has the potential for blocking the passage 14 or preventing the insertion of the insert 12 into the passage 14.

Figure 2:
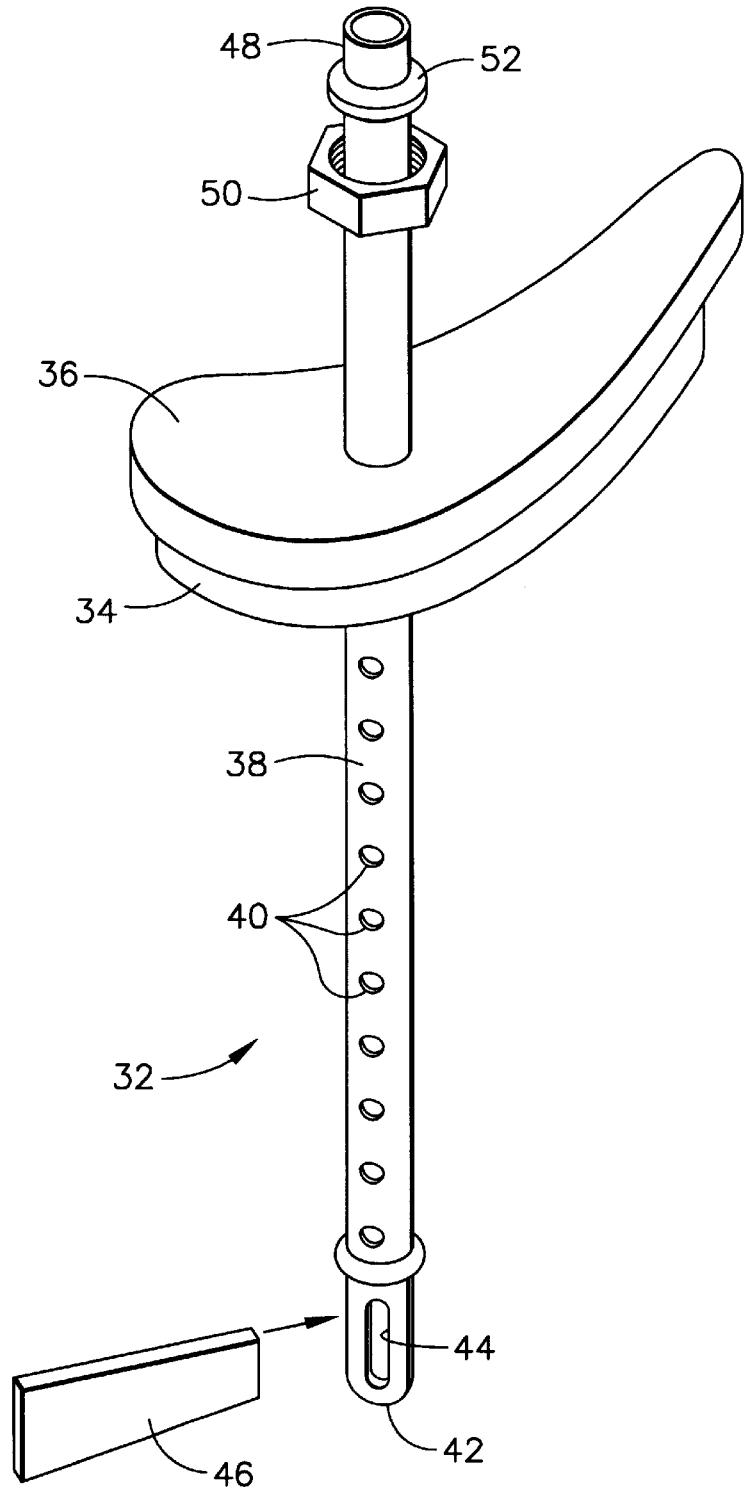
FIG. 2 is a perspective view of a weld repair fixture for use with the nozzle of FIG. 1 in accordance with this invention.

Shown in FIG. 2 is a fixture assembly 32 configured to prevent ingress of molten weld filler material into the passage 14 during repair of the crack 30 by welding. The fixture assembly 32 is configured to be inserted into the cooling passage 14 through an opening 20 in the outer band 18, so that a contoured rim 34 of the fixture assembly 32 is closely received in the opening 20 and a contoured collar 36 abuts the surface of the outer band 18 surrounding the opening 20. The exact size and shape of the rim 34 and collar 36 will necessarily vary, depending on the particular configuration of the nozzle 10. Extending from the rim 34 is an elongate pipe 38 equipped with a longitudinal row of ports 40. The end of the pipe 38 opposite the collar 36 is closed, terminating with a flattened section 42 having a slot 44 sized to receive a locking wedge 46 for a purpose to be discussed below. The pipe 38 is fluidically connected to an inlet pipe 48 on the opposite side of the collar 36. The inlet pipe 48 is intended to deliver a gas, preferably an inert gas such as argon, to the pipe 38, where the gas is discharged through the ports 40 in a radial direction relative to the longitudinal axis of the pipe 38. The inlet pipe 48 is shown as being equipped with a compression coupling nut 50 and compression washer 52 for attachment to an inert gas source. Suitable materials for the fixturing assembly 32 are those that can withstand the high temperatures necessary to weld repair the nozzle 10. While various materials could be used, a suitable material for the rim 34 and collar 36 is copper, and a suitable material for the pipe 38, inlet pipe 48, compression coupling nut 50 and compression washer 52 are stainless steels.

Figure 3:
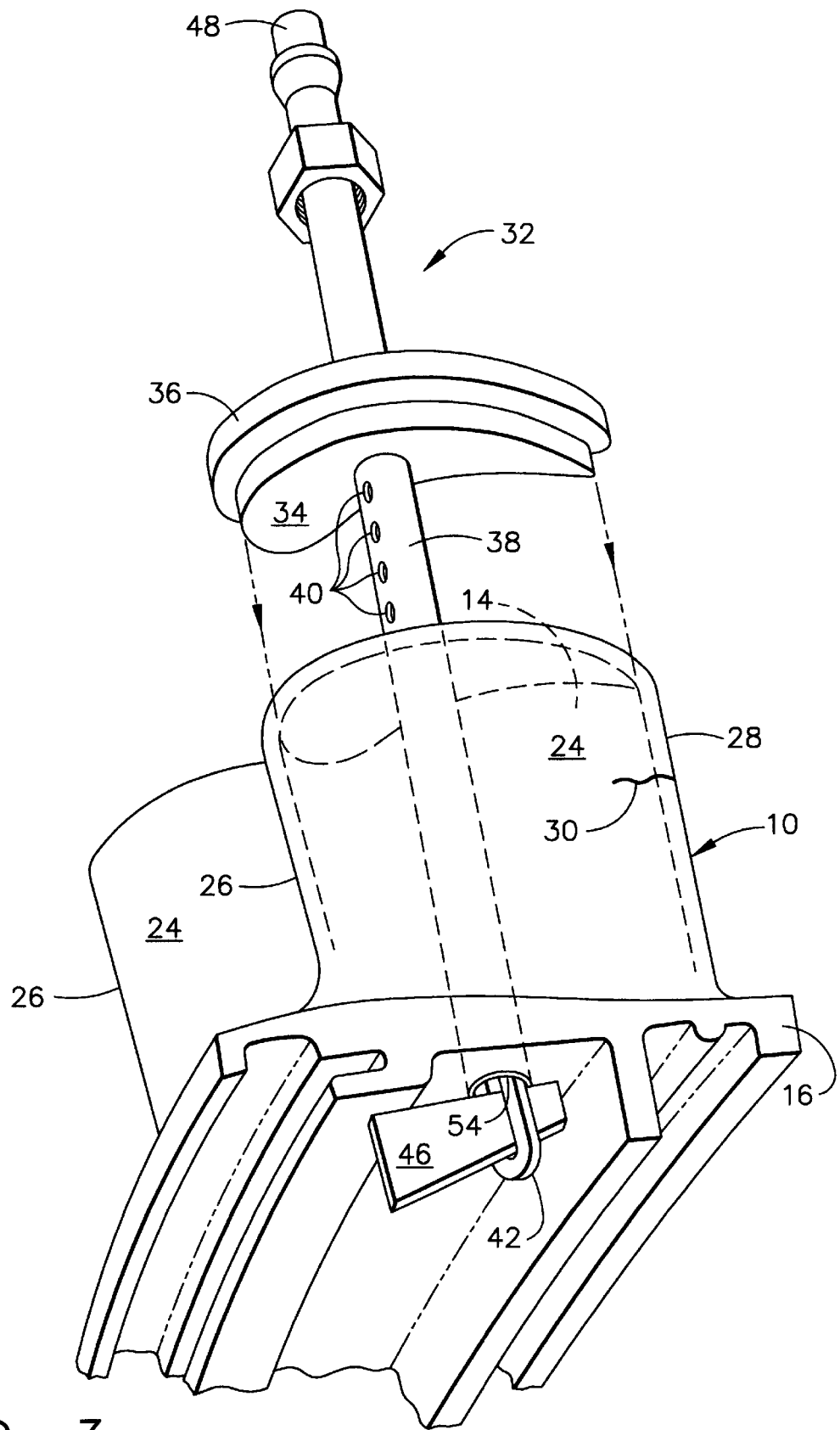
FIG. 3 is a perspective view of the fixture of FIG. 2 assembled with the nozzle of FIG. 1 in accordance with this invention, with part of the nozzle being omitted for clarity.

In FIG. 3, the fixture assembly 32 is shown inserted in the cooling passage 14 of one of the airfoils 24 of FIG. 1 with a crack 30 at its trailing edge 28. (The outer band 18 and the adjacent portions of the airfoils 24 are omitted from FIG. 3 to better illustrate the fixture assembly 32.) The flattened section 42 of the fixture assembly 32 is shown as projecting through an opening 54 in the inner band 16, and the wedge 46 is shown received in the slot 44 to secure the fixture assembly 32 within the cooling passage 14. The flattened section 42 is preferably sized and shaped to closely fit within the opening 54 in order to minimize leakage through the opening 54.

The ports 40 in the pipe 38 are shown as facing away from the trailing edge 28 and toward the leading edge 26 of the airfoil 24. According to the invention, directing the inert gas toward the leading edge 26 of the airfoil 24 causes the gas to slightly pressurize the passage 14, though all of the gas is eventually vented from the airfoil 24 through the cooling holes 22 (not shown in FIG. 3). The pressure within the passage 14 must be sufficient to prevent molten weld filler material from entering the passage 14, yet not so high as to prevent the filler material from completely filling the crack 30 intended for repair. While gas flow rates and resulting pressure necessary to achieve the objects of this invention will vary depending on the particular airfoil 24, including the number and size of its cooling holes 22, it is believed that suitable results will typically be achieved with flow rates on the order of about 10 to 40 standard cubic feet per hour (about 283 to about 1130 liters/hour), and often in the range of about 32 to 35 standard cubic feet per hour (about 906 to about 992 liters/hour).

Once fixtured as described above, welding can be performed using any suitable technique, such as tungsten inert gas, plasma transferred arc, and laser beam welding. Welding is preferably performed in an inert atmosphere that can be maintained at least in part by the inert gas supplied by the fixture assembly 32. After the weld repair, the insert 12 (FIG. 1) is installed in the cooling passage 14 without interference from the presence of weld filler material within the passage 14.

While the invention has been described in terms of a preferred embodiment, it is apparent that other forms could be adopted by one skilled in the art. Accordingly, the scope of the invention is to be limited only by the following claims.

What is claimed is:

1. A method of welding an article having an interior cavity fluidically coupled to a hole at a surface of the article, the method comprising the steps of:

inserting a fixture within the cavity, the fixture closing a first opening to the cavity through which the fixture is inserted into the cavity;

flowing a gas through the fixture into the cavity so as to pressurize the cavity, the gas exiting the cavity through the hole; and then welding the article, the gas being sufficiently pressurized within the cavity to prevent ingress of molten weld filler material into the cavity.

2. A method according to claim 1, wherein the fixture directs the gas into the cavity in a direction away from the hole.

3. A method according to claim 1, wherein the fixture directs the gas into the cavity in a direction opposite the hole.

4. A method according to claim 1, wherein an end of the fixture protrudes from a second opening in the article opposite the first opening to the cavity, the fixture being secured within the second opening.

5. A method according to claim 1, wherein the welding step entails repairing a through-wall crack in the article.

6. A method of repairing a superalloy article with an air-cooled airfoil having a leading edge, a trailing edge, a through-wall crack at the trailing edge, and an interior cooling passage fluidically coupled to a plurality of cooling holes at the trailing edge, the method comprising the steps of:

inserting a fixture within the cooling passage, the fixture having a first portion that closes a first opening to the cooling passage through which the fixture is inserted into the cooling passage, the fixture having an elongate portion with an aligned longitudinal row of ports, the fixture being positioned in the cooling passage such that the ports face the leading edge of the airfoil;

flowing an inert gas through the fixture and the ports into the cooling passage toward the leading edge so as to pressurize the cooling passage, the gas thereafter exiting the cooling passage through the cooling holes; and then weld repairing the crack in the airfoil, the gas within the cooling passage being maintained at a pressure sufficient to prevent ingress of molten weld filler material through the crack into the cooling passage, yet allow molten weld filler material to fill the crack.

7. A method according to claim 6, wherein an end of the fixture protrudes from a second opening in the article opposite the first opening to the cooling passage, the fixture being secured within the second opening.

8. A method according to claim 6, further comprising the step of installing an insert in the cooling passage after weld repairing the crack.

9. A method according to claim 6, wherein the article is a gas turbine engine nozzle.

10. An assembly for welding an article having an interior cavity fluidically coupled to a hole at a surface of the article, the assembly comprising a fixture insertable within the cavity, the fixture having a first portion for closing a first opening to the cavity through which the fixture is inserted into the cavity, the fixture further having an elongate portion with an aligned longitudinal row of ports for flowing a gas into the cavity so as to pressurize the cavity before the gas exits the cavity through the hole, the ports being in sufficient number and size to maintain the gas within the cavity at a sufficient pressure to prevent ingress of molten weld filler material into the cavity through a crack in the article, yet allow molten weld filler material to fill the crack.

11. An assembly according to claim 10, wherein the ports are oriented relative to the first portion of the fixture to direct the gas into the cavity in a direction away from the hole.

12. An assembly according to claim 10, wherein the ports are oriented relative to the first portion of the fixture to direct the gas into the cavity in a direction opposite the hole.

13. An assembly according to claim 10, wherein an end of the fixture is adapted to protrude from and be securable within a second opening in the article opposite the first opening to the cavity.

14. An assembly according to claim 10, wherein the article comprises an air-cooled airfoil having a leading edge and a trailing edge, the cavity is an interior cooling passage of the airfoil, the hole is one of a plurality of cooling holes at the trailing edge of the airfoil, and the crack is at the trailing edge, and wherein the fixture is positioned in the cooling passage such that the ports face the leading edge of the airfoil.

15. An assembly comprising:
   a superalloy article having an interior cavity with a first opening and fluidically coupled to a hole at a surface of the article;
   a fixture mounted within the cavity through the first opening, the fixture having means for closing the first opening and having means for flowing a gas into the cavity so as to pressurize the cavity before the gas exits the cavity through the hole, the flowing means causing the gas within the cavity to be sufficiently pressurized to prevent ingress of molten weld filler material into the cavity through a crack in the article yet allow molten weld filler material to fill the crack.

16. An assembly according to claim 15, wherein the flowing means of the fixture directs the gas into the cavity in a direction away from the hole.

17. An assembly according to claim 15, wherein the flowing means of the fixture directs the gas into the cavity in a direction opposite the hole.

18. An assembly according to claim 15, wherein an end of the fixture protrudes from a second opening in the article opposite the first opening to the cavity.

19. An assembly according to claim 15, wherein the fixture has a first portion configured to close the first opening to the cooling passage, the fixture having an elongate portion having a plurality of ports that define the flowing means.

20. An assembly according to claim 19, wherein the article comprises an air-cooled airfoil having a leading edge and a trailing edge, the cavity is an interior cooling passage, the hole is one of a plurality of cooling holes at the trailing edge of the airfoil, and the crack is at the trailing edge, and wherein the fixture is positioned in the cooling passage such that the ports face the leading edge of the airfoil.

* * * * *